Dec. 27, 1938.  B. M. CARTER  2,141,740
MANUFACTURE OF CARBON BISULPHIDE
Filed Oct. 20, 1937   3 Sheets-Sheet 1

INVENTOR
Bernard M. Carter
BY
ATTORNEY

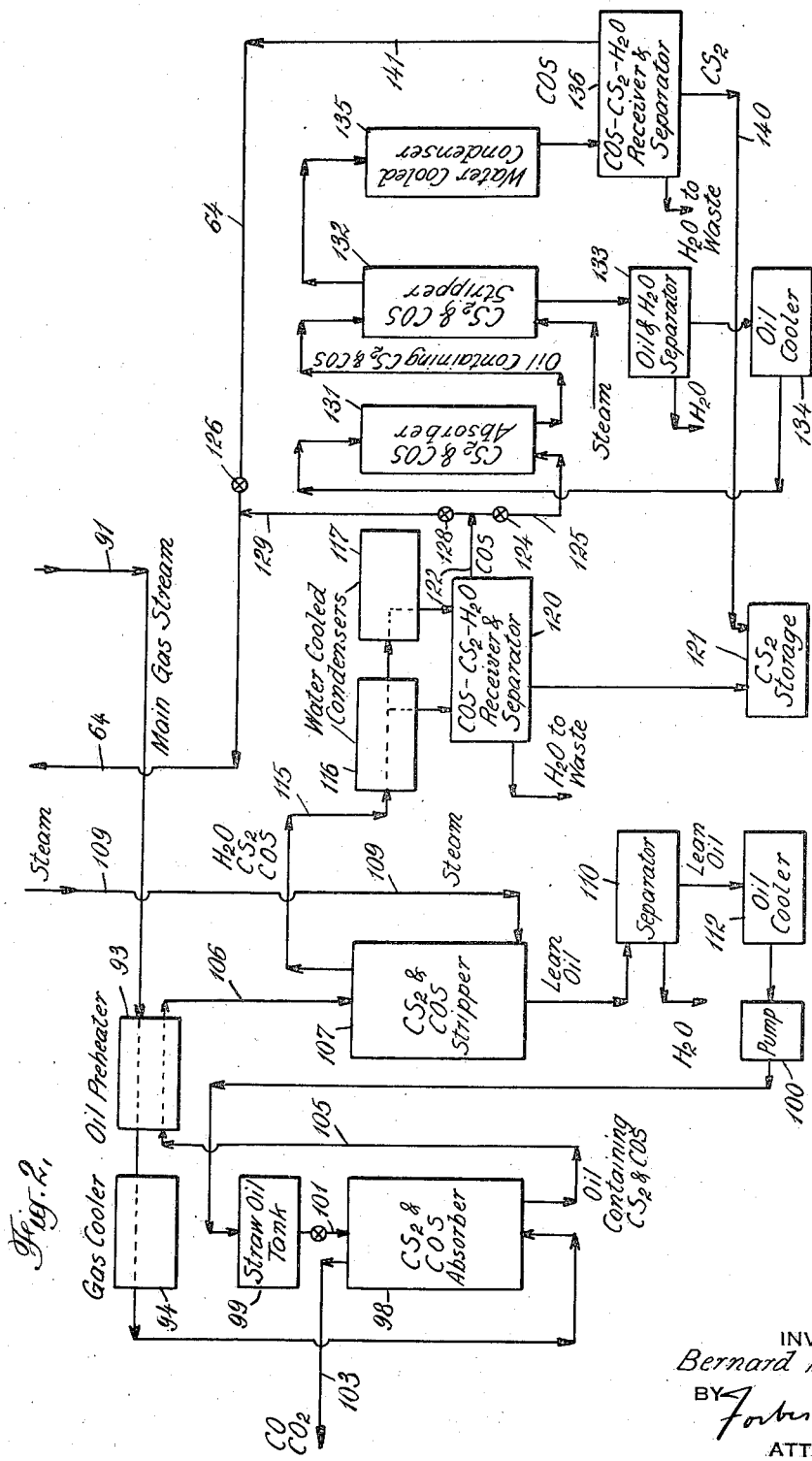

Dec. 27, 1938.   B. M. CARTER   2,141,740
MANUFACTURE OF CARBON BISULPHIDE
Filed Oct. 20, 1937   3 Sheets—Sheet 3
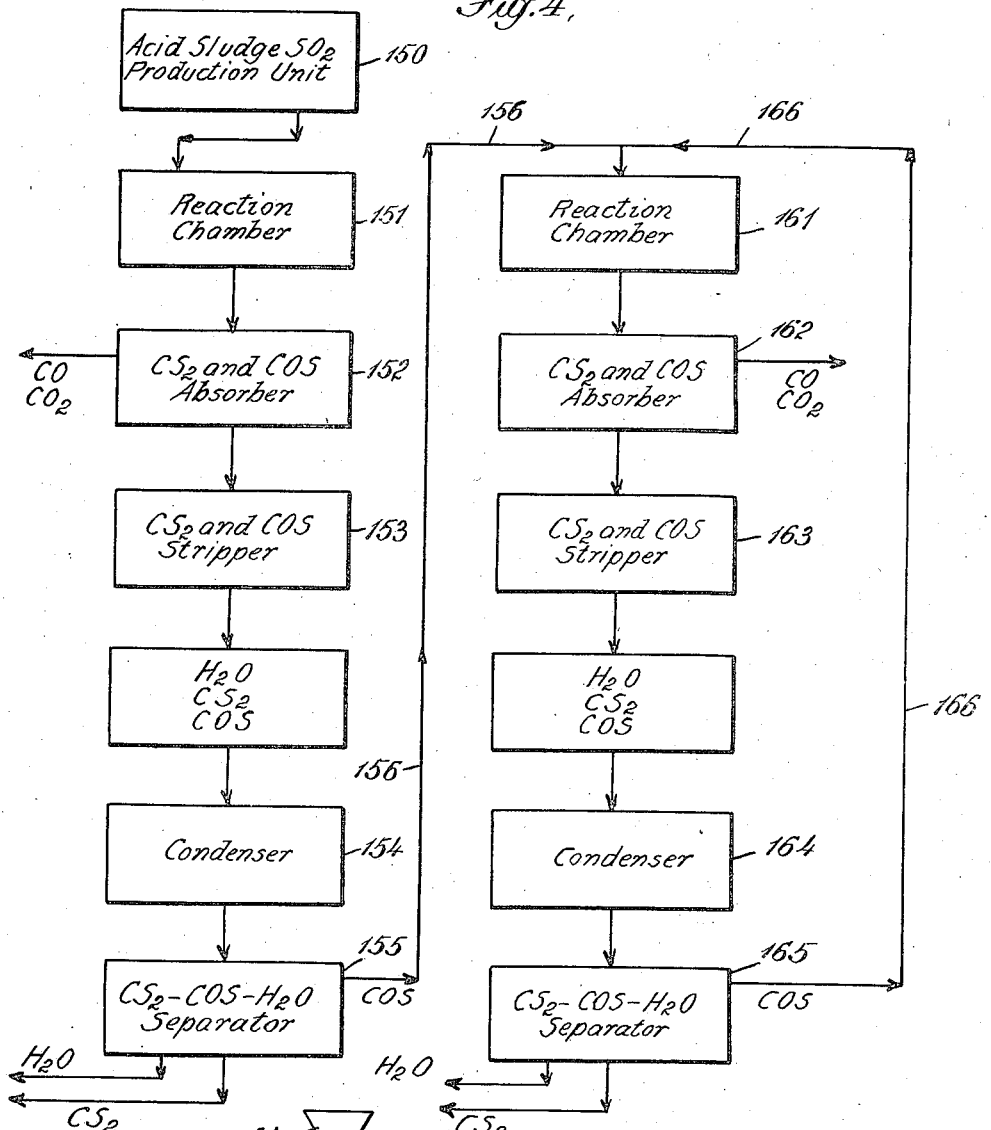
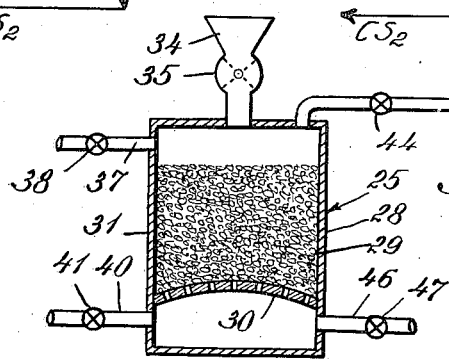
INVENTOR
Bernard M. Carter
BY
ATTORNEY Patented Dec. 27, 1938

2,141,740

UNITED STATES PATENT OFFICE 2,141,740

MANUFACTURE OF CARBON BISULPHIDE

Bernard M. Carter, Montclair, N. J., assignor to General Chemical Company, New York, N. Y., a corporation of New York Application October 20, 1937, Serial No. 169,985

13 Claims. (Cl. 23—206)

This invention relates to the manufacture of carbon bisulphide by combining sulphur and carbon. More particularly the invention is directed to improvements in production of carbon bisulphide in processes in which the $CS_2$ forming reaction is carried out in the presence of appreciable amounts of oxygen, for example where sulphur dioxide gas is used as a source of sulphur.

Production of carbon bisulphide from sulphur dioxide gas and solid carbonaceous material such as wood charcoal has been suggested. In most previous methods, however, the carbon bisulphide yield has been low, of the order of 35%, the remaining sulphur having been lost as COS and unreacted elemental sulphur. In the present specification the term "yield" is used to define the percentage of sulphur, introduced into the reaction, e. g. as sulphur dioxide, which is converted to carbon bisulphide. Acid sludges, constituting waste products of oil refining processes in which sulphuric acid is used, may be decomposed by heating to produce sulphur dioxide gas and solid carbonaceous coke-like residues. Acid sludge coke containing little or no volatile matter is a particularly active type of carbonaceous material and may be used as a source of carbon in the manufacture of carbon bisulphide. Commercially, carbon bisulphide has been commonly produced by reacting sulphur, usually in the form of sulphur vapor, and wood charcoal, at high temperatures, e. g. around 1450–1650° F. in externally heated pots or retorts. Such retorts are pear-shaped and small, being generally not more than about 30 inches in diameter. It has been impractical to make the retorts any larger because the high external temperatures required to force the necessary heat to the center of the reaction mass would be prohibitive. The retorts have been made of cast iron and are relatively short-lived on account of the deteriorating effects of the high temperatures externally applied and the corrosive effects of sulphur and of the carbon bisulphide produced. Furthermore, large numbers of such retorts are required to obtain any substantial production of product. Consequently, installation and maintenance costs are high, retort replacements constituting a major portion of operating costs.

In processes for the manufacture of carbon bisulphide where the $CS_2$ forming reaction is carried out in the presence of oxygen, for example where oxygen is introduced into the $CS_2$ reaction zone as the oxygen of $SO_2$, variable but substantial amounts of COS are formed. Such COS formation cuts down the $CS_2$ yield and causes loss of sulphur as COS. The principal object of the present invention is to provide for the manufacture of carbon bisulphide, in procedures of the type mentioned where oxygen is present in the $CS_2$ formation reaction, by a method by which there may be obtained carbon bisulphide yields as high as 75–80%. The invention also aims to provide methods by which loss of sulphur as COS is eliminated or substantially reduced, and by which the necessity for producing elemental sulphur or $SO_2$ from COS tail gases and making provision for disposal of obnoxious waste gases are avoided. Another object of the invention is to provide a method in which sulphur dioxide gases and acid sludge cokes, both derived from waste material such as acid sludges, may be used in place of brimstone and wood charcoal, the previously utilized more expensive materials. A further object of the invention is to overcome the disadvantages mentioned above in connection with the apparatus usually employed in the manufacture of carbon bisulphide. The invention affords processes in which a different type of apparatus, cheaply built and maintained, may be employed. To this end the invention provides processes by means of which the reaction zone may be heated internally, that is, heat needed to maintain the endothermic reaction is supplied directly to the interior of or generated within the reaction zone.

The invention is directed to methods for increasing the overall $CS_2$ yields where the $CS_2$ formation reaction is carried out in a reaction zone containing oxygen the presence of which seems to invariably tend to increase COS formation. Hence, the principles of the invention are applicable in any situation where the reactants introduced into the reaction zone contain oxygen, whether as oxygen of $SO_2$ or COS, as oxygen of CO or $CO_2$ which possibly might be introduced into the reaction zone along with sulphur vapor, or oxygen in other form depending upon the source and nature of the sulphur fed into the reaction zone to supply the sulphur needed to combine with the carbon. However, the principles of the invention may be employed to substantial commercial advantage when using sulphur dioxide gas as a source of sulphur, and accordingly the invention will be described in this connection.

In carrying out a preferred embodiment of the invention, when starting operations, sulphur dioxide for example, is introduced into a reaction zone containing a sufficiently active form of carbon and maintained at temperatures high enough to effect combination of sulphur and carbon to produce carbon bisulphide. The exit gas mixture of the reaction zone comprises $CS_2$, COS and inerts chiefly CO and $CO_2$. The $CS_2$ and the COS are separated, as by absorption in a suitable absorbent from other gaseous and/or vaporous reaction products. The $CS_2$ and the COS are stripped from the absorbent, and the $CS_2$ is then separated, as by condensation, from the COS and the $CS_2$ is recovered as product of the process. The COS gas is then contacted with carbon preferably by mixing the COS with the fresh $SO_2$ entering the system, the resulting $SO_2$—COS gas mixture being passed through the reaction zone. As before, the $CS_2$ and the COS formed are separated from the other reaction products, $CS_2$ and COS separated from each other, the $CS_2$ being recovered as product and the COS again returned to the reaction zone mixed with incoming $SO_2$. The process of the invention when under way and operated in a continuous manner is a cyclic procedure in which substantially all of the COS formed in the operation is recycled continuously through the reaction zone.

The nature of the invention, the details, objects and advantages thereof may be more fully understood from a consideration of the following description taken in connection with the accompanying drawings, in which Figs. 1 and 2 constitute a diagrammatic illustration of a plant lay-out;

Fig. 3 is a vertical section of an individual reaction chamber; and

Fig. 4 is a diagrammatic illustration of a modified plant lay-out.

Figure 1:
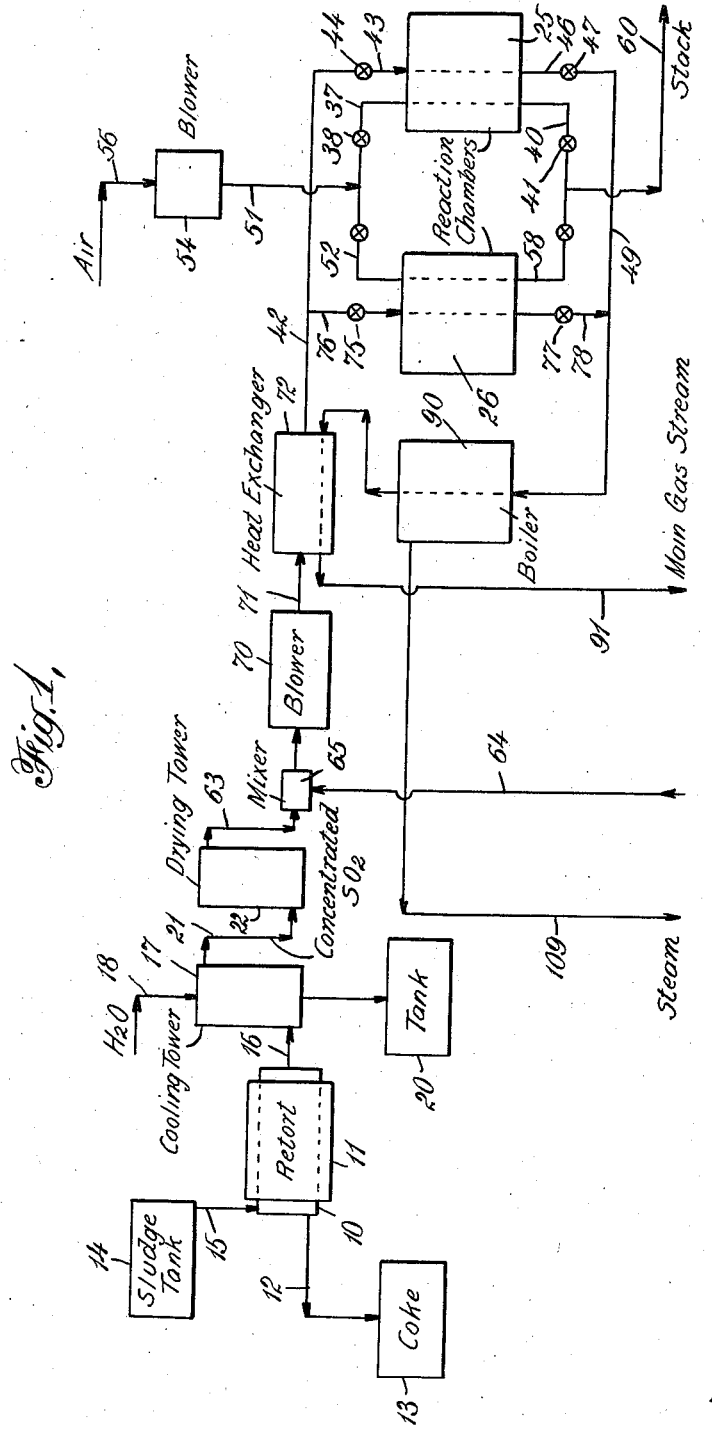

As indicated, concentrated sulphur dioxide gas and the carbonaceous material used in the improved process as sources of sulphur and carbon are preferably sulphur dioxide gases and acid sludge coke obtained by decomposition of sulphuric acid sludges constituting waste products of oil refining processes. Referring particularly to the sulphur dioxide and acid sludge coke production unit of the plant lay-out of Fig. 1 of the drawings, 10 indicates an acid sludge decomposing retort. The particular construction of the retort is no part of the invention although the sludge is preferably decomposed in the absence of air or other diluting gases by external heating. Retort 10 may consist for example of a fixed drum or chamber extending through furnace setting 11 and may be equipped with rabbles or a screw conveyor by which the coke formed during decomposition of the sludge is continuously discharged from retort 10 through an outlet 12 and collected in a coke storage chamber 13. A rotary kiln may be employed if desired. Acid sludge may be fed into the retort from tank 14 through pipe 15 containing a suitable control valve.

One end of gas conduit 16 opens into the interior of the sludge decomposing chamber and affords means for conducting the gases and vapors generated by decomposition of the sludge into the bottom of a cooling tower 17. The latter may be a vertical cylindrical vessel provided at the top with a spray arranged to create in the tower a downwardly flowing spray of water or other cooling liquid introduced through pipe 18. Water and oil condensate run out of the bottom of the tower through an outlet pipe into a receiving tank 20. After rising through the tower, countercurrent to the cooling liquid, the cooled sulphur dioxide gases are discharged from the top of the tower into gas line 21 connected to drying tower 22.

Fig. 1 shows reaction chambers 25 and 26 diagrammatically. As illustrated in Fig. 3, reaction chamber 25 comprises a vertically elongated steel shell 28 provided with a lining 29 of suitable resistant refractory material such as firebrick. In the lower end of the reaction chamber is a perforated arch 30 affording support for a bed 31 of charcoal or coke of substantial depth. Solid carbonaceous material, as from coke bin 13, is fed into the top of the reaction chamber from hopper 34 by an air-lock 35. Air for use during the blasting cycle is charged into the top of the reaction chamber through pipe 37 provided with a control valve 38. The hot gases produced during the blasting cycle are discharged from the bottom of the reaction chamber through pipe 40 controlled by valve 41. Sulphur dioxide gas is introduced into the top of the reaction chamber through conduit 43 having a control valve 44, and carbon bisulphide, other gases and vapors formed during the reaction flow through pipe 46, having a control valve 47, into outlet header 49. Reaction chamber 26 is built the same as chamber 25 of Fig. 3. As shown in Fig. 1, air inlet pipe 37 of chamber 25 is connected to an air inlet header 51 which communicates with air inlet pipe 52 of chamber 26. One end of header 51 opens into the pressure side of a blower 54 having an air inlet 56.

Combustion gas outlet pipe 40 of chamber 25 and combustion gas outlet pipe 58 of chamber 26 feed into a connection 60 which may be used to conduct the hot combustion gases to the plant stack or to boilers or heat exchangers in the system.

In carrying out the process of the invention, relatively concentrated sulphur dioxide gas produced in any way, and any form of active carbon such as wood charcoal may be used as sources of sulphur and carbon, although it is preferred to use concentrated sulphur dioxide gases and acid sludge coke which may be produced in the sludge decomposing unit shown in Fig. 1 as follows:

Acid sludges, resulting from refining of hydrocarbon oils with sulphuric acid, vary widely in composition. One representative sludge was found to have a titratable acidity of about 50.8% expressed as $H_2SO_4$, and yielded on decomposition by destructive distillation about 28% residual coke, and a retort gas which, after cooling to about normal temperatures, produced about 6% condensable oils, about 35% water, based on the weight of the sludge, the balance of the retort gas comprising sulphur dioxide, carbon dioxide, carbon monoxide, nitrogen, and uncondensable hydrocarbons and water vapor. Although the invention is not dependent upon any particular method for the destructive distillation of sludge material, derived from sulphuric acid refining of oils, to produce sulphur dioxide gas and sludge coke, decomposition of the sludge is preferably effected by externally heating a body of sludge, in a substantially air-tight, elongated kiln or retort, mounted in a furnace setting and arranged to provide for feed of sludge into and withdrawal of sulphur dioxide gases from one end, discharge of residual coke from the other end, and maintenance of the higher temperatures at the coke discharge end and lower temperatures at the sludge inlet end. The burners in the furnace combustion chamber 11 are controlled so as to maintain sludge material temperatures in the retort not less than about 300° F. at the cold end and not more than about 700° F. at the hot end. It is preferred to maintain temperatures of about 325° F. at sludge inlet end and about 450° F. at coke discharge end. On heating, the free and combined sulphuric acid contained in the sludge is reduced by hydrocarbons and/or by the carbonaceous matter present in the sludge, and the gas mixture evolved contains sulphur dioxide and water vapor, as the major constituents, together with smaller quantities of hydrocarbon vapors, carbon dioxide, carbon monoxide and nitrogen.

Preferably, decomposition of the sludge is effected at temperatures such as above noted, and under such conditions that decomposition proceeds only to approximately a point at which most of the free and/or combined sulphuric acid initially contained in the sludge is reduced. In this situation, the solid carbonaceous residues formed usually contain appreciable quantities of volatile hydrocarbons. In the case of some sludges the volatile matter content of this residue may run in excess of 38–40%. Sludge coke produced by the above method and discharged from retort 10 into coke storage bin 13 may analyze substantially as follows:

| | Percent |
|---|---|
| Total acidity $H_2SO_4$ | 2.1 |
| Ash | 1.2 |
| Total volatile matter, including $H_2SO_4$ | 32.1 |
| Fixed carbon | 66.7 |

The gases formed in retort 10 by decomposition of the sludge and discharged into pipe connection 16 contain generally not substantially in excess of 20% by volume of sulphur dioxide, around 75–80% water vapor, and smaller quantities of hydrocarbon vapors and carbon dioxide. The retort gas flows through line 16 into cooling tower 17 and is contacted therein with a downwardly flowing stream of water introduced through pipe 18. The gas stream rising through the tower is cooled, and the bulk of the water and condensable hydrocarbon vapors of the retort gas stream are condensed and run out of the tower with the cooling liquid into tank 20. The quantity of water run through the tower is regulated so as to cool the sulphur dioxide gas to about 100° F. at which temperature the gas stream enters the gas line 21 and is conducted into drying tower 22.

The gas in conduit 21 is a concentrated gas and may contain 85 to practically 95–98% $SO_2$. Where the gas contains diluents the same may comprise small quantities of $CO_2$, CO, $N_2$ and hydrocarbons. Although it is preferred to use strong sulphur dioxide gases of the type mentioned, weaker gases may be employed if desired. For example, sludge may be decomposed in retort 10 by direct contact with hot combustion gases in which case, on account of dilution of the retort gas, the concentration of the gas in line 21 may be as low as 25% sulphur dioxide. Whatever the source of the sulphur dioxide gases, the sulphur dioxide concentration preferably is not substantially less than about 25% by volume, it having been found that where the gas is more dilute, relatively too much heat is required to heat up the large volume of inert gas to the reaction temperature of sulphur dioxide and carbon.

It is preferable to use in the reaction chambers 25 and 26 sludge material coke, such as that indicated above from which the volatile matter has been expelled by heating to temperatures of around 1400–1650° F. for a sufficient period of time, e. g. 2–6 hours to drive preferably substantially all the volatile matter out of the coke or in any case to reduce the volatile matter content of the coke to not more than about 3%. When following this procedure, coke from bin 13 is so treated and then utilized in the reaction chambers 25 and 26. However, when operating in accordance with the preferred embodiments of the invention, the coke recovered in bin 13, for example, a coke such as mentioned above containing substantial quantities of volatile matter, may be charged directly into a reaction chamber and the volatile matter may be substantially removed during the air blasting cycle. The volatile matter remaining in the coke after the air blasting contains such a relatively small amount of hydrogen that loss of sulphur as $H_2S$ is of minor importance. It will be appreciated, therefore, that the carbonaceous material charged into reaction chambers 25 and 26 to serve as a source of carbon may be wood charcoal, coke as recovered in receptacle 13 containing relatively large amounts of volatile matter, or such coke from which the volatile matter has been previously substantially all removed. A supply of whatever type of carbonaceous material to be used is maintained in hoppers 34 on top of the reaction chambers.

Carbonaceous material of whatever suitable kind used, preferably the acid sludge coke containing substantial amounts of volatile matter, is fed from hopper 34 into the reaction chamber 25. When starting up operations, valves 44 and 47 in lines 43 and 46 are closed. Following initial ignition of the coke, air is fed into the top of the chamber from pipe 37 and air blowing is continued until the temperature of the reaction chamber 25 and of the material therein is at least about 200 or 300° F. in excess of about 1450–1475° F. To secure the most economical operating results, however, it is desirable to continue the air blasting cycle until the temperature in the reaction chamber is raised to at least about 2000° F., and preferably in the neighborhood of 2000–2300° F. When using sludge coke containing substantial amounts of volatile matter, blasting should be continued long enough and the temperature raised high enough to reduce the volatile matter content (i. e., chiefly hydrocarbons) of the coke to not more than about 3%. Where air blasting is carried out until the temperature of the reaction chamber is about 2000° F., such temperatures are sufficiently high to insure reduction of the volatile matter content to the desired degree. It will be understood, however, it is not necessary to raise the temperature of the reaction chamber to 2000° F., since the volatile matter content of the coke may be reduced by blasting at lower temperatures for relatively longer periods of time.

When air is blown through the hot coke bed, carbon is burned first to $CO_2$ which to a considerable extent is reduced to CO by further contact with hot coke. The hot blasting cycle exit gases comprising chiefly nitrogen, carbon dioxide and carbon monoxide pass out of chamber 25 by pipe 40 and flow into connection 60 from whence the hot waste gases may be drawn for use in boilers or heat exchangers about the plant or for any other purpose desired. It is noted this gas may contain substantial amounts of CO which may be burned to generate further amounts of heat. After the bed of carbonaceous material in the reaction chamber 25 has been heated as described, valve 38 in air line 37 and valve 41 in gas outlet pipe 40 are closed. Chamber 25 is then ready and valve 44 in $SO_2$—COS inlet pipe 43 and valve 47 in carbon bisulphide vapor outlet pipe 46 are opened.

The concentrated sulphur dioxide gas in line 21 is passed through drying tower 22 where moisture is removed as far as practicable. Substantial absence of water and free oxygen in the gas is desirable since hydrogen combines with sulphur, thus increasing sulphur losses as $H_2S$, and oxygen increases the COS, $CO_2$ and CO content of the reaction chamber exit gas.

In accordance with the invention, it has been found that substantially increased $CS_2$ yields, on the basis of the sulphur charged into the system as sulphur dioxide, for example, may be obtained by reacting the sulphur dioxide with a sufficiently active type of carbon to produce a gas mixture comprising $CS_2$, COS, and inerts such as CO and $CO_2$; separating $CS_2$ and COS from the other gaseous and/or vaporous reaction products; separating the $CS_2$ from the COS and recovering $CS_2$ as product; further contacting the COS with active carbon, preferably by mixing the COS with the incoming raw $SO_2$ and then passing the resulting $SO_2$—COS gas mixture through the reaction zone; recovering further $CS_2$ formed as product and again returning the COS to the reaction zone. In other words, the process of the invention comprises preferably a cyclic procedure in which substantially all of the COS formed in the system is recycled continuously through the reaction zone.

Investigations upon which the invention is based show that for any given set of conditions the COS content of the exit gases of a $CS_2$ reaction zone is about the same, whether the COS content of the reaction gas is or is not recycled through the reaction zone. It thus appears that in the present process, the recycled COS reacts with carbon to produce $CS_2$ and/or acts possibly to some extent to repress formation of further amounts of COS from the fresh incoming sulphur-oxygen compound. Whatever may be the reactions involved, it has been found in accordance with the invention that losses of sulphur as COS may be avoided or largely reduced and $CS_2$ yield may be substantially increased by recycling COS produced in a previous cycle of the operation.

The concentrated $SO_2$ gas in line 63 (the exit gas of drying tower 22) may contain from 85 to roughly 100% $SO_2$. As will be seen from subsequent disclosure, the COS gas in COS gas line 64 may contain 55–70% COS, 5–15% CO, and 15–30% inert including possible small amounts of $CO_2$. Gas mixer 65 is provided with orifice meters by means of which quantities of gas fed into the mixer from $SO_2$ line 63 and from COS line 64 may be regulated. In order to recycle through the reaction chambers 25 or 26 substantially all of the COS formed in the system, under average operating conditions about 25–35% of the gas drawn into blower 70 from mixer 65 comprises COS gas from line 64, the balance consisting of concentrated $SO_2$ gas from line 63. Under such conditions the exit gas of mixer 65 may comprise upward of about 65% $SO_2$, the balance consisting of COS plus inert including CO and possibly some $CO_2$.

The exit gas of mixer 65 is passed into the system by blower 70 which forces the gas through line 71 and heat exchanger 72 into inlet header 42. The gas in line 71 is ordinarily at temperatures of about 100° F. When starting up the process, at which time no hot reaction gases are available for preheating the incoming gas in heat exchanger 72, any suitable means may be used to heat up incoming gases to temperatures of about 800–1000° F. After operations are under way, the incoming gases are heated to this extent in transferrer 72, by heat exchange with hot outgoing reaction gases. The hot sulphur dioxide gas then flows from header 42 through pipe 43 into the top of chamber 25.

Assuming that operations are under way and that a preheated $SO_2$—COS gas mixture, such as mentioned above has been introduced into the reaction chamber, at the high temperatures prevailing in the reaction zone, hot carbon and sulphur combine to form $CS_2$ vapors which leave the reaction chamber at temperatures upwards of about 1500° F. through pipe 46 and enter gas outlet header 49. In one example, when employing an $SO_2$—COS gas of the nature mentioned above, the exit gas mixture of the reaction chamber contained substantially no $H_2S$ or unreacted $SO_2$ and excluding the $CS_2$ vapor, the gas comprised by volume about 21% COS, 2% $CO_2$, 73% CO, and 4% inert. In this continuous operation, the $CS_2$ yield, based on the amount of sulphur fed into the system as $SO_2$, was about 77%. In this particular operation, the average temperature in the reaction zone was about 1545° F.

As the reaction taking place in chamber 25 is endothermic, the temperature in the reaction zone gradually decreases on account of loss of heat absorbed by the reaction as well as by radiation and heat carried out by the reaction gas. When the temperature in the reaction chamber drops to a point below which further production of carbon bisulphide is not economical, for example 1500° F., valve 44 in $SO_2$ gas feed pipe 43 and valve 47 in $CS_2$ vapor line 46 are closed and reaction chamber 25 is taken off $CS_2$ production. Valve 38 in air line 37 and valve 41 in blasting cycle exit gas pipe 40 are opened and air is again passed through the reaction chamber to burn sufficient amount of coke to again raise the temperature in the reaction zone to around 2000–2300° F. From time to time further quantities of coke are added to the reaction chamber 25 from hopper 34. Since coke is fed into the reaction chamber in relatively small increments in the course of operation as described no difficulty is encountered in connection with insuring reduction of the volatile matter content of the coke to the desired extent.

It will be understood that reaction chamber 26 is a duplicate of and is arranged in parallel with chamber 25. When chamber 25 is on the blasting cycle, by suitable regulation of the several valves reaction chamber 26 is operated on the production cycle to form carbon bisulphide. During this phase of operation, it will be understood that valve 75 in $SO_2$ gas supply pipe 76 and valve 77 in $CS_2$ vapor pipe 78 are opened, and the reaction takes place in chamber 26 in the same way as has been described in connection with reaction chamber 25.

Although it is generally preferred to generate heat in the reaction zone by burning part of the carbonaceous material used as a source of carbon in the production of carbon bisulphide as described, in instances where it is desired to conserve coke or charcoal, heating up of the reaction zone to the desired temperatures may be advantageously accomplished in other ways. For example, oil, gas or other combustible material in suitable quantities may be injected into the reaction chamber together with the necessary amount of air and burned to raise the temperature of the reaction zone to the required degree. In this instance, although some of the coke or charcoal in the reaction chamber may be burned, the bulk of the heat needed is supplied by burning of the oil, gas or other fuel and consumption of coke or charcoal for this purpose is minimized. If desired, operations may be carried out in an externally heated reaction chamber. As a rule best $CS_2$ yields are obtained where average operation temperatures are within the range of about 1460–1575° F.

The gases leaving the reaction chamber are carried by header 49 to a waste heat boiler 90 where the gas temperature is reduced to about 1100° F. at which temperature the gases pass into the heat exchanger 72 for preheating the incoming $SO_2$ gases. The $CS_2$ gases after leaving transferrer 72 are carried by line 91 thru oil preheater 93, (Fig. 2) cooled to about 300° F., and are desirably passed through another cooler 94 in which the gas temperature is reduced to about 100° F.

In accordance with the invention, it has been found that straw oil constitutes a very suitable material for absorbing both $CS_2$ and COS contained in the furnace gases. Accordingly, exit gases of cooler 94 are passed into the bottom of a $CS_2$ and COS absorbing tower 98 over which absorbent straw oil is circulated. A supply of straw oil is maintained in tank 99 by circulating pump 100. The quantity and rate of flow of oil down thru tower 98 are controlled by valve 101 so as to effect absorption of substantially all of the $CS_2$ and COS contained in the upwardly flowing furnace gases. The proper rate of flow of oil through tower 98 may be readily determined to suit any particular set of operating conditions. In this way substantially all of the COS and $CS_2$ of the gas stream becomes absorbed in the oil and is thus separated from most of the remaining inert furnace gases, principally CO and $CO_2$, which are discharged from the system through line 103.

The effluent oil in tower 98, containing absorbed $CS_2$ and COS, runs through line 105, preheater 93 and line 106, into $CS_2$ and COS stripping still 107. This stripper comprises a tower or column provided with means in the bottom for introduction of live steam and with any suitable refluxing arrangement in the upper part. Oil rich in absorbed $CS_2$ and COS is fed into the top of the stripper and steam, at temperature of about 101° C. from boiler 90 and line 109 is introduced into the bottom of the stripper. Stripped oil runs from the bottom of tower 107 into a suitable separator 110 in which oil and condensed water are separated, and the separated oil, after cooling to about 100° F. in cooler 112, is returned by pump 100 to oil tank 99.

Steam, $CS_2$ vapor and COS gas discharged from the top of stripper 107, flow through line 115 and through two water-cooled condensers 116 and 117 connected in series. These coolers are operated so as to liquefy substantially all of the water and $CS_2$ vapor which together with the COS gas collect in a receiver or separator 120. If desired, condensers 116 and 117 may be refrigerated to effect maximum condensation of $H_2O$ and $CS_2$. In receiver 120, water and $CS_2$ are separated, the water being discharged to waste and the $CS_2$ run into $CS_2$ storage tank 121.

The gas discharged from separator 120 into line 122 may comprise 55–70% COS, 5–15% CO, and 15–30% other inert. Where the apparatus units ahead of separator 120 are operating under optimum conditions, the gas in line 122 ordinarily contains but little $CS_2$, in which circumstance valve 124 in line 125 and valve 126 in COS gas header 64 may be closed and valve 128 in line 129 opened to pass the COS gas from separator 120 directly through lines 122 and 129 into the COS gas header 64 which feeds the COS gas into the mixer 65. However, should operating conditions in apparatus units preceding separator 120 be such that the COS gas in line 122 contains substantial amounts of $CS_2$, valve 128 is closed and valve 124 opened to conduct $CS_2$—COS gas into the bottom of a second absorbing tower 131. The absorber 131, stripper 132, oil and water separator 133, oil cooler 134, condenser 135, and $CS_2$—COS—$H_2O$ receiver and separator 136 are operated in the same way as absorber 98 and stripper 107 and associated apparatus units previously described. Liquid $CS_2$ recovered in separator 136 is run into $CS_2$ storage tank 121 thru line 140 and the COS exit gas of receiver 136 goes through line 141 into COS gas header 64 and thence through valve 126 into mixer 65, the composition of the gas in line 141 being of the nature of that previously mentioned.

Fig. 4 is a diagrammatic illustration of apparatus used in carrying out a modification of the process of the invention. In the apparatus of Fig. 4, acid sludge-$SO_2$ production unit 150, reaction chamber 151, absorber 152 and stripper 153, condenser 154 and $CS_2$—COS—$H_2O$ separator 155 may be constructed and operated the same as reaction chamber 25, absorber 98, stripper 107, condensers 116 and 117, and $CS_2$—COS—$H_2O$ separator 120 of Figs. 1 and 2. However, instead of returning the COS exit gas of separator 155 of Fig. 4 to reaction chamber 151 (as in the preferred modification of Figs. 1 and 2) the COS exit gas of separator 155 is run through a line 156 into a second reaction chamber 161. Absorber 162, stripper 163, condenser 164, and $CS_2$—COS—$H_2O$ separator 165 are constructed and operated in the same way as absorber 152, stripper 153, condenser 154, and separator 155 of Fig. 4. However, the COS exit gas of separator 165 is returned through line 166 to and is recycled through reaction chamber 161 which is constructed and operated substantially the same as reaction chambers 25 of Fig. 1 and 151 of Fig. 4, except that in reaction chamber 161 the sulphur-oxygen compound is supplied as COS from line 156 and recycling line 166.

It has also been found that activated carbon, for example "Norite" is a satisfactory absorbent for both $CS_2$ and COS, especially for COS. If it is desired to use this material, the absorbed $CS_2$ and COS may be released by heating to say 105° C. If desired, the $CS_2$ may be absorbed in straw oil, and the exit gas of the straw oil absorber passed into an absorber containing activated carbon. The COS subsequently released from the carbon by heating may be fed into the COS gas line 64 to introduce the COS into mixer 65.

While the improved process has been described in connection with use of $SO_2$ gas as the source of sulphur, in which case at least part of the oxygen of the $SO_2$ tends to combine with carbon and sulphur to form COS, it will be understood the principles of the invention are applicable where oxygen is introduced in other forms, for example as COS, CO, or $CO_2$ which gases might be present in the gas mixture entering the reaction zone. To illustrate, the advantages afforded by the invention are available should the sulphur be introduced largely in the form of vapor in a gas mixture containing say CO. In the claims, the expression "inert reaction products" is intended to include reaction products other than $CS_2$ and COS such as CO, $CO_2$, $N_2$, etc.

I claim:

1. The method for making carbon bisulphide which comprises introducing into a reaction zone containing a body of solid carbonaceous material a stream of sulphurous gas comprising materials of the class consisting of sulphur dioxide, sulphur vapor and carbon oxysulphide maintaining said zone at temperatures sufficiently high to effect combination of carbon with sulphur of said gas to form carbon bisulphide, withdrawing from the reaction zone an exit gas mixture containing carbon bisulphide, carbon oxysulphide and inert reaction products, separating the carbon bisulphide and carbon oxysulphide from inert reaction products, recovering carbon bisulphide, introducing said separated carbon oxysulphide and further quantities of said sulphurous gas into said zone to effect formation of further quantities of carbon bisulphide, and recovering further quantities of carbon bisulphide from the reaction zone exit gas mixture.

2. In the method for making carbon bisulphide involving maintaining a reaction zone containing carbonaceous material at temperatures sufficiently high to effect combination of sulphur and carbon to produce carbon bisulphide, passing through said zone a stream of sulphurous gas comprising materials of the class consisting of sulphur dioxide, sulphur vapor and carbon oxysulphide, to effect formation of a reaction zone exit gas mixture containing carbon bisulphide and carbon oxysulphide, separating carbon bisulphide from carbon oxysulphide, and separately recovering carbon bisulphide and carbon oxysulphide; the improvement which comprises recycling the carbon oxysulphide through the reaction zone.

3. In the method for making carbon bisulphide involving maintaining a reaction zone containing solid carbonaceous material at temperatures sufficiently high to effect combination of sulphur and carbon to produce carbon bisulphide, passing through said zone a stream of sulphurous gas comprising materials of the class consisting of sulphur dioxide, sulphur vapor and carbon oxysulphide, to effect formation of a reaction zone exit gas mixture containing carbon bisulphide and carbon oxysulphide, and recovering carbon bisulphide from said gas mixture; the improvement which comprises carrying out the reaction in the presence of carbon oxysulphide formed in a previous reaction.

4. The method for making carbon bisulphide which comprises continuously introducing into a reaction zone containing a body of solid carbonaceous material a stream of sulphurous gas comprising materials of the class consisting of sulphur dioxide, sulphur vapor and carbon oxysulphide, maintaining said zone at temperatures sufficiently high to effect combination of carbon with sulphur of said gas to form carbon bisulphide, continuously withdrawing from the reaction zone an exit gas mixture containing carbon bisulphide, carbon oxysulphide and inert reaction products, continuously separating the carbon bisulphide and carbon oxysulphide from inert reaction products, recovering carbon bisulphide, and continuously returning said separated carbon oxysulphide to said zone.

5. The method for making carbon bisulphide which comprises introducing into a reaction zone containing a body of solid carbonaceous material a stream of sulphur dioxide gas, maintaining said zone at temperatures sufficiently high to effect combination of carbon and sulphur of said sulphur dioxide gas, to form carbon bisulphide, withdrawing from the reaction zone an exit gas mixture containing carbon bisulphide, carbon oxysulphide and inert reaction products, separating the carbon bisulphide and carbon oxysulphide from inert reaction products, recovering carbon bisulphide, introducing said separated carbon oxysulphide and further quantities of sulphur dioxide into said zone to effect formation of further quantities of carbon bisulphide, and recovering further quantities of carbon bisulphide from the reaction zone exit gas mixture.

6. The method for making carbon bisulphide which comprises introducing into a reaction zone containing a body of solid carbonaceous material an incoming stream of gas containing carbon oxysulphide gas, maintaining said zone at temperatures sufficiently high to effect combination of carbon of said solid carbonaceous material with sulphur of said carbon oxysulphide gas to form carbon bisulphide, withdrawing from the reaction zone an exit gas mixture containing carbon bisulphide, carbon oxysulphide and inert reaction products, separating the carbon bisulphide and carbon oxysulphide from inert reaction products, recovering carbon bisulphide, introducing said separated carbon oxysulphide and further quantities of said incoming carbon oxysulphide gas into said zone to effect formation of further quantities of carbon bisulphide, and recovering further quantities of carbon bisulphide from the reaction zone exit gas mixture.

7. The method of making carbon bisulphide which comprises introducing into a reaction zone containing a body of solid carbonaceous material a stream of sulphurous gas comprising materials of the class consisting of sulphur dioxide, sulphur vapor and carbon oxysulphide, maintaining said zone at temperatures sufficiently high to effect combination of carbon with sulphur of said gas to form carbon bisulphide, withdrawing from the reaction zone an exit gas mixture containing carbon bisulphide, carbon oxysulphide and inert reaction products, contacting said gas mixture with an absorbent adapted to absorb both carbon bisulphide and carbon oxysulphide to separate carbon bisulphide and carbon oxysulphide from inert reaction products, separating carbon bisulphide and carbon oxysulphide from the absorbent and separately recovering carbon bisulphide and carbon oxysulphide, introducing said carbon oxysulphide and further quantities of said sulphurous gas into said zone to effect formation of further quantities of carbon bisulphide, and recovering further quantities of carbon bisulphide from the reaction zone exit gas mixture.

8. The method for making carbon bisulphide which comprises introducing into a reaction zone containing a body of solid carbonaceous material a stream of sulphur dioxide gas, maintaining said zone at temperatures sufficiently high to effect combination of carbon with sulphur of said sulphur dioxide to form carbon bisulphide, withdrawing from the reaction zone an exit gas mixture containing carbon bisulphide, carbon oxysulphide and inert reaction products, contacting said gas mixture with straw oil under conditions to effect separation of both carbon bisulphide and carbon oxysulphide from inert reaction products, separating carbon bisulphide and carbon oxysulphide from the straw oil by steam distillation, cooling the resultant gas-vapor mixture to condense carbon bisulphide and separate the same from the carbon oxysulphide, recovering carbon bisulphide, introducing said separated carbon oxysulphide and further quantities of sulphur dioxide into said zone to effect formation of further quantities of carbon bisulphide, and recovering further quantities of carbon bisulphide from the reaction zone exit gas mixture.

9. The method for making carbon bisulphide which comprises introducing into a reaction zone containing a body of solid carbonaceous material a stream of sulphurous gas comprising materials of the class consisting of sulphur dioxide, sulphur vapor and carbon oxysulphide, maintaining said zone at temperatures sufficiently high to effect combination of carbon with sulphur of said gas to form carbon bisulphide, withdrawing from the reaction zone an exit gas mixture containing carbon bisulphide, carbon oxysulphide and inert reaction products, separating the carbon bisulphide and carbon oxysulphide from inert reaction products, recovering carbon bisulphide, introducing said separated carbon oxysulphide and a greater proportion by volume of further quantities of said sulphurous gas into said zone to effect formation of further quantities of carbon bisulphide, and recovering further quantities of carbon bisulphide from the reaction zone exit gas mixture.

10. The method for making carbon bisulphide which comprises introducing into a reaction zone containing a body of solid carbonaceous material a stream of sulphur dioxide gas, maintaining said zone at temperatures sufficiently high to effect combination of carbon with sulphur of said sulphur dioxide gas to form carbon bisulphide, withdrawing from the reaction zone an exit gas mixture containing carbon bisulphide, carbon oxysulphide and inert reaction products, separating the carbon bisulphide and carbon oxysulphide from inert reaction products, recovering carbon bisulphide, introducing said separated carbon oxysulphide into contact with a body of solid carbonaceous material at temperatures sufficiently high to effect combination of carbon of such solid carbonaceous material with sulphur of said separated carbon oxysulphide to effect formation of further quantities of carbon bisulphide.

11. The method for making carbon bisulphide which comprises introducing into a reaction zone containing a body of solid carbonaceous material a stream of sulphur dioxide gas, maintaining said zone at temperatures sufficiently high to effect combination of carbon with sulphur of said sulphur dioxide gas to form carbon bisulphide, withdrawing from the reaction zone an exit gas mixture containing carbon bisulphide, carbon oxysulphide and inert reaction products, separating the carbon bisulphide and carbon oxysulphide from inert reaction products, recovering carbon bisulphide, introducing said separated carbon oxysulphide into a second reaction zone containing a body of solid carbonaceous material, maintaining said second zone at temperatures sufficiently high to effect combination of carbon of such solid carbonaceous material with sulphur of said separated carbon oxysulphide to effect formation of further quantities of carbon bisulphide, and recovering further quantities of carbon bisulphide from the exit gas mixture of said second zone.

12. The method for making carbon bisulphide which comprises decomposing sludge material, derived from sulphuric acid treatment of petroleum oils, by heating to form solid carbonaceous residue and hot sulphur dioxide gas mixture containing condensable vapors, cooling the hot gas mixture to condense the bulk of the condensable vapors and form a concentrated sulphur dioxide gas, introducing a stream of the sulphur dioxide gas into a reaction zone containing a body of solid carbonaceous material, maintaining said zone at temperatures sufficiently high to effect combination of carbon with sulphur of said sulphur dioxide gas to form carbon bisulphide, withdrawing from the reaction zone an exit gas mixture containing carbon bisulphide, carbon oxysulphide and inert reaction products, separating the carbon bisulphide and carbon oxysulphide from inert reaction products, recovering carbon bisulphide, introducing said separated carbon oxysulphide and further quantities of said concentrated gas into said zone to effect formation of further quantities of carbon bisulphide, and recovering further quantities of carbon bisulphide from the reaction zone exit gas mixture.

13. The method for making carbon bisulphide which comprises decomposing sludge material, derived from sulphuric acid treatment of petroleum oils, by heating to form solid carbonaceous residue and hot sulphur dioxide gas mixture containing condensable vapors, cooling the hot gas mixture to condense the bulk of the condensable vapors and form a concentrated sulphur dioxide gas, introducing a stream of the sulphur dioxide gas into a reaction zone containing a body of said solid carbonaceous residue containing not more than about 3% volatile matter, maintaining said zone at temperatures sufficiently high to effect combination of carbon with sulphur of said sulphur dioxide gas to form carbon bisulphide, withdrawing from the reaction zone an exit gas mixture containing carbon bisulphide, carbon oxysulphide and inert reaction products, contacting said gas mixture with straw oil under conditions to effect separation of both carbon bisulphide and carbon oxysulphide from inert reaction products, separating carbon bisulphide and carbon oxysulphide from the straw oil by steam distillation, cooling the resultant gas-vapor mixture to condense carbon bisulphide and separate the same from the carbon oxysulphide, recovering carbon bisulphide, introducing said separated carbon oxysulphide and a greater proportion by volume of further quantities of said concentrated sulphur dioxide gas into said zone to effect formation of further quantities of carbon bisulphide, and recovering further quantities of carbon bisulphide from the reaction zone exit gas mixture.

BERNARD M. CARTER.